United States Patent [19]

Chen et al.

[11] Patent Number: 5,726,991
[45] Date of Patent: Mar. 10, 1998

[54] INTEGRAL BIT ERROR RATE TEST SYSTEM FOR SERIAL DATA COMMUNICATION LINKS

[75] Inventors: Dao-Long Chen; Robert D. Waldron, both of Fort Collins, Colo.; Khanh C. Nguyen, Whitehall, Pa.

[73] Assignees: AT&T Global Information Solutions Company, Dayton, Ohio; Hyundai Electronics America, San Jose, Calif.; Symbios Logic Inc., Fort Collins, Colo.

[21] Appl. No.: 545,915

[22] Filed: Oct. 20, 1995

Related U.S. Application Data

[63] Continuation of Ser. No. 434,882, May 3, 1995, abandoned, which is a continuation of Ser. No. 72,823, Jun. 7, 1993, abandoned.

[51] Int. Cl.[6] .................................................. G06F 11/00
[52] U.S. Cl. ................................................................. 371/5.1
[58] Field of Search ........................... 371/20.4, 20.5, 371/5.1, 5.2, 5.3, 5.4, 5.5

[56] References Cited

U.S. PATENT DOCUMENTS

| | | | |
|---|---|---|---|
| 3,380,023 | 4/1968 | Magnuski | 371/20.4 |
| 3,562,710 | 2/1971 | Halleck | 371/5.1 |
| 3,596,245 | 7/1971 | Hodge et al. | 371/5.4 |
| 3,689,884 | 9/1972 | Tew, Jr. | 371/20.4 |
| 4,428,076 | 1/1984 | Schuon | 371/5.1 |
| 5,289,474 | 2/1994 | Purcell et al. | 371/20.5 |

*Primary Examiner*—Robert W. Beausoliel, Jr.
*Assistant Examiner*—P. Vales
*Attorney, Agent, or Firm*—David F. Zinger; Wayne P. Bailey

[57] ABSTRACT

A data communication method and apparatus includes an integral bit error rate test system. The system is adapted to receive digital data signals to be transmitted over a communication link and includes a transmitter for transmitting the data signals onto the link. A test signal pattern generator generates a determinable pattern of digital bit test signals which are insertable into an input of the transmitter in place of the digital data signals. A receiver is coupled to the link for receiving the bit test signals and for comparing the received pattern of the bit test signals to the determinable pattern. The bit error rate is computed from the number of bit differences between the transmitted test signals and the determinable pattern.

13 Claims, 3 Drawing Sheets

INTEGRAL BIT ERROR RATE TEST SYSTEM FOR SERIAL DATA COMMUNICATION LINKS

This is a continuation of application Ser. No. 08/434,882 filed May 3, 1995, now abandoned, which is a continuation of application Ser. No. 08/072,823 filed Jun. 7, 1993, now abandoned.

BACKGROUND OF THE INVENTION

The present invention relates to serial data communication links and, more particularly, to an integral bit error rate test system for apparatus used in serial data communication links.

The performance of a digital communication system is measured by the probability of bit error or the bit error rate. In present day communication systems, the bit error rate is normally better than one bit error for a trillion bits transmitted. In general, the quality of a digital communication system is the performance of the system at low transmitted power, since the bit error rate can always be reduced by increasing transmitted power. The better of two systems, otherwise the same, is the one that can achieve a desired bit error rate with a lower transmitted power. Accordingly, testing of systems to determine the bit error rate is a common and critical measurement.

Traditionally, bit error rate measurements require expensive test equipment such as, for example, the Tektronics, Inc. Model CSA907 bit error rate tester. This tester, as well as other commercially available testers, typically handles serial data inputs and outputs. None of the commercially available bit error rate testers are believed to be capable of handling parallel data thus requiring additional time and forcing the bit error rate measurements to be difficult for most systems. Furthermore, the transmitter and receiver in the communication system must be detached from the system in order to perform the bit error rate measurements. Such detachment also makes the bit error rate measurements cumbersome and time consuming. Accordingly, it would be desirable to provide a system which accommodates bit error rate testing and overcomes the above identified disadvantages of the prior art.

SUMMARY OF THE INVENTION

It is an object of the present invention to provide a method for testing the bit error rate of a communication system which overcomes the above and other disadvantages of the prior art. More particularly, among the several objects of the present invention may be noted the provision of a built in or integral bit error rate tester which eliminates the requirement for an external bit error rate test system; the provision of an integral bit error rate tester which can be selectively activated for performing bit error rate tests; and the provision of a bit error rate tester which can handle parallel as well as serial data comparison for bit error rate.

The above and other objects are achieved in a system including a data communication apparatus having an integral or internal bit error rate test system. The apparatus includes a source of digital signals to be transmitted over a communication link and a transmitter coupled between the source and the link for transmitting the signals onto the link. The system further includes means for generating a determinable pattern of digital bit test signals and means for inserting the bit test signals into an input of the transmitter in place of the digital signals from the source. Receiver means is coupled to the link for receiving the bit test signals. The receiver means includes comparing means coupled in circuit with the receiver means for comparing the received pattern of the bit test signals to the determinable pattern for measuring the bit error rate. In one form, the bit test signal generating means comprises a pseudo random bit pattern generator. The receiver means in such embodiment includes an identical pseudo random bit pattern generator for generating a bit pattern identical to the transmitted bit pattern. The comparing means compares the transmitted bit pattern to the bit pattern generated locally and provides an error signal for each occurrence of a bit error. A counter means is coupled to the receiver for counting each generated bit error for establishing the bit error rate. The receiver means may include random access memory or bit accumulation registers for accumulating a predetermined number of bits into a preselected byte. The comparison means may then be connected to the memory or register so as to compare the bit patterns on a byte by byte basis.

In one form, the apparatus includes a multiplexor having a first input for receiving the determinable bit pattern and a second input for receiving a normal signal to be transmitted onto the communication link. The multiplexor may be selectively actuated so as to select either the bit test pattern for insertion onto the communication link or to select the normal data for coupling to the communication link. Preferably, each apparatus includes both a transmitter and receiver for coupling to the communication link for full duplex communication. For test purposes, the transmitter may be connected through a circular communications link to the receiver on the same apparatus so as to test the apparatus in a stand alone condition. For this particular arrangement, the pseudo random bit pattern generator may be utilized to generate the bit test pattern for both the transmitter and receiver so as to eliminate at least one bit test pattern generator. Under conditions in which the apparatus is tested in circuit with another apparatus, the pseudo random test pattern generator may produce a code to identify to the receiver the particular test pattern to be generated. The receiver in turn may recognize the particular transmitted code and produce an identical bit test pattern for comparison to the transmitted test pattern.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
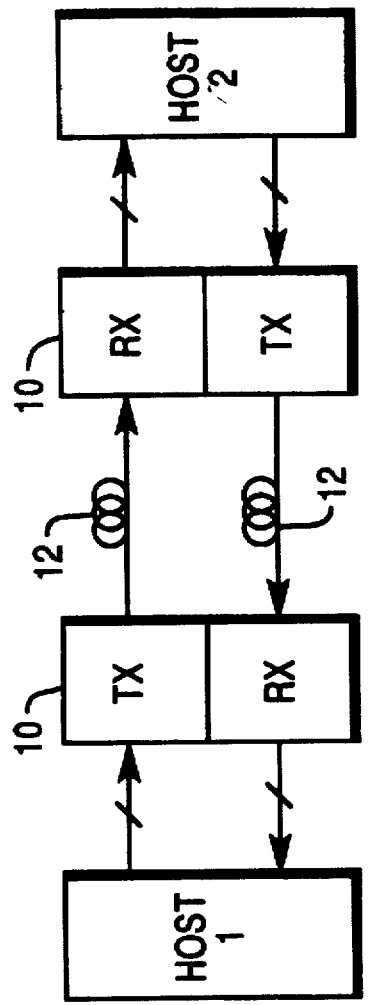
FIG. 1 is a simplified, functional block diagram of a pair of communication devices coupled together via a communication link in accordance with the prior art.

Referring first to FIG. 1, there is shown a simplified block diagram of a full duplex serial data communication link between a pair of communication devices indicated as Host 1 and Host 2. The system of FIG. 1 is the type which might be found in a conventional local area network (LAN) in which Host 1 comprises a first computer and Host 2 comprises a second computer. In this form, each computer includes a substantially identical circuit board 10 incorporating a transmitter Tx and receiver Rx for digital data. The transmitter portion of circuit board 10 converts parallel data from the computer (Host 1) into a serial data bit stream before transmitting the data via the communication link 12, which link may be any of the conventional types such as, for example, a fiber optic conductor or a radio transmission link. At the receiving end, the receiver Rx extracts clock timing signals from the incoming data bit stream and converts the serial data back to a parallel format. Bit errors can be introduced into this transmitting and receiving process due to many factors such as random noise, data pattern dependent jitter and duty cycle distortion as well as others.

Figure 2:
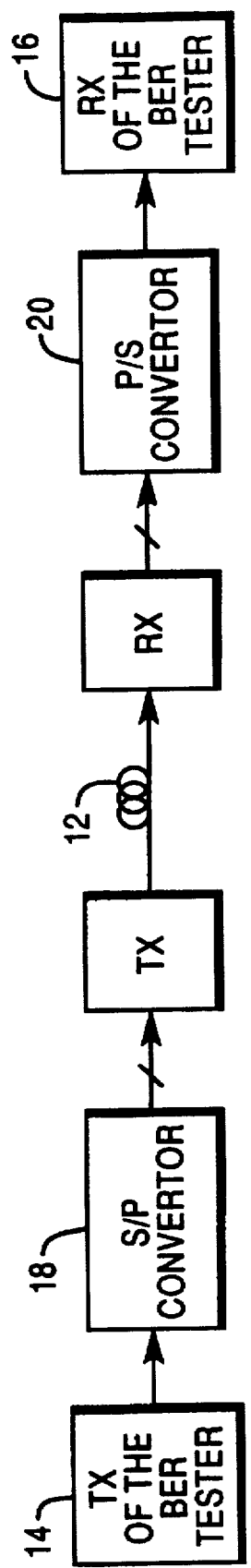
FIG. 2 is a simplified block diagram of a conventional bit error rate test system for use with the system of FIG. 1.

Since it is important to know the expected bit error rate for a given system, bit error rate testers have traditionally been required to measure the bit error rate. Referring to FIG. 2, there is shown a conventional arrangement of the system of FIG. 1 for testing with a commercially available bit error rate tester comprising transmit portion 14 and receive portion 16. In order to perform the test, the transmitter Tx and receiver Rx are separated from their respective hosts 1 and 2. The transmit portion 14 of the bit error rate tester is then connected through a serial-to-parallel converter 18 so that serial data from the tester transmit portion 14 is converted to parallel data to be applied to the transmitter Tx. At the receiving end, received data accumulated into data bytes or parallel format by the receiver Rx is converted by a parallel-to-serial converter 20 to a serial data bit stream and then supplied to the receive portion 16 of the bit error rate tester. For a full duplex system, the return channel from Host 2 to Host 1 is tested in an identical manner.

As can be appreciated from the illustrative arrangement of FIG. 2, bit error rate testing in the prior art has required disassembly of the apparatus, such as a personal computer (PC), in order to implement testing. Further, such testing has required a relatively expensive test set and the addition of serial-to-parallel and parallel-to-serial converters.

Figure 3:
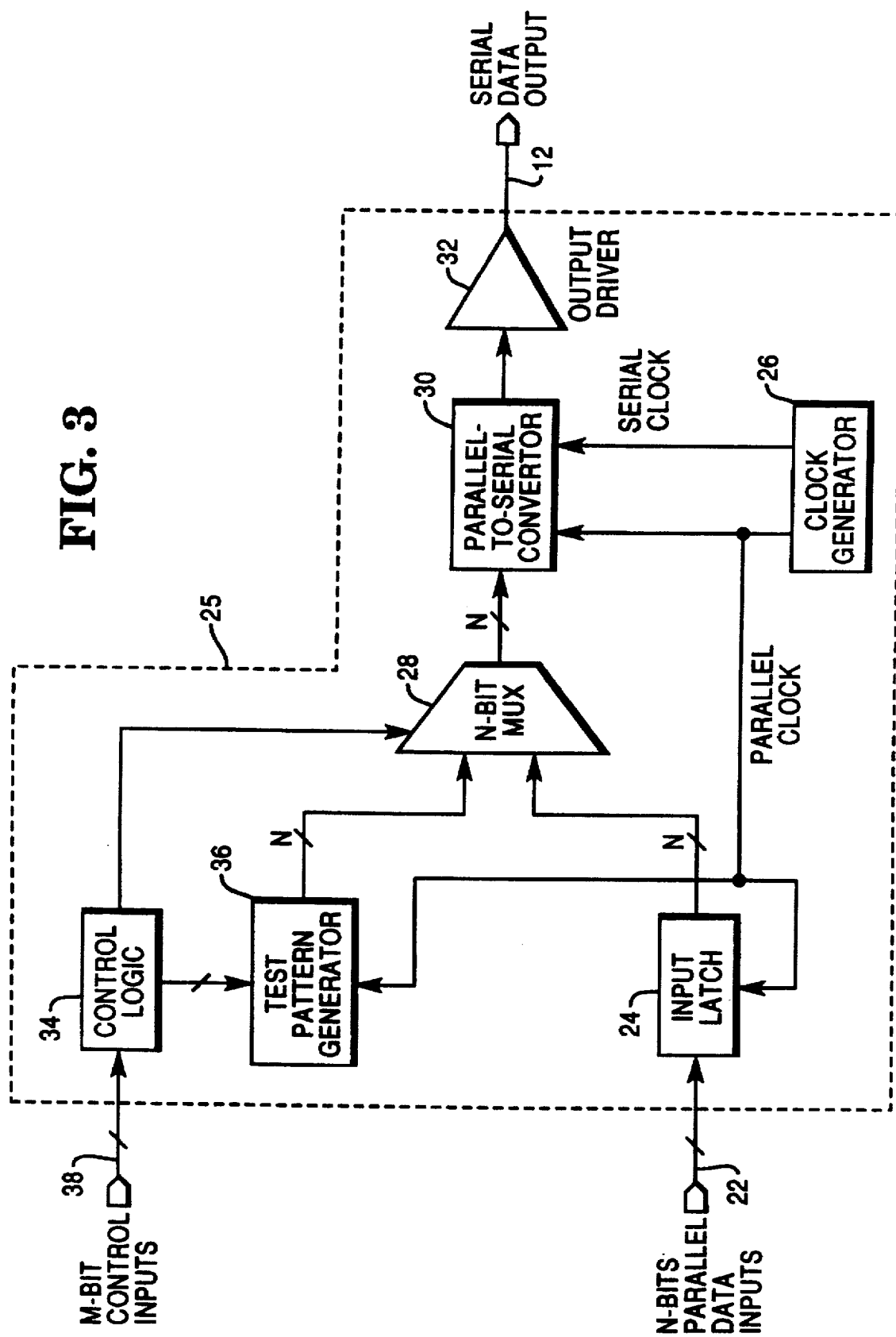
FIG. 3 is a simplified block diagram of a transmitter incorporating an integral test pattern generator and system for inserting a bit test pattern for transmission on a digital communication link.
Figure 4:
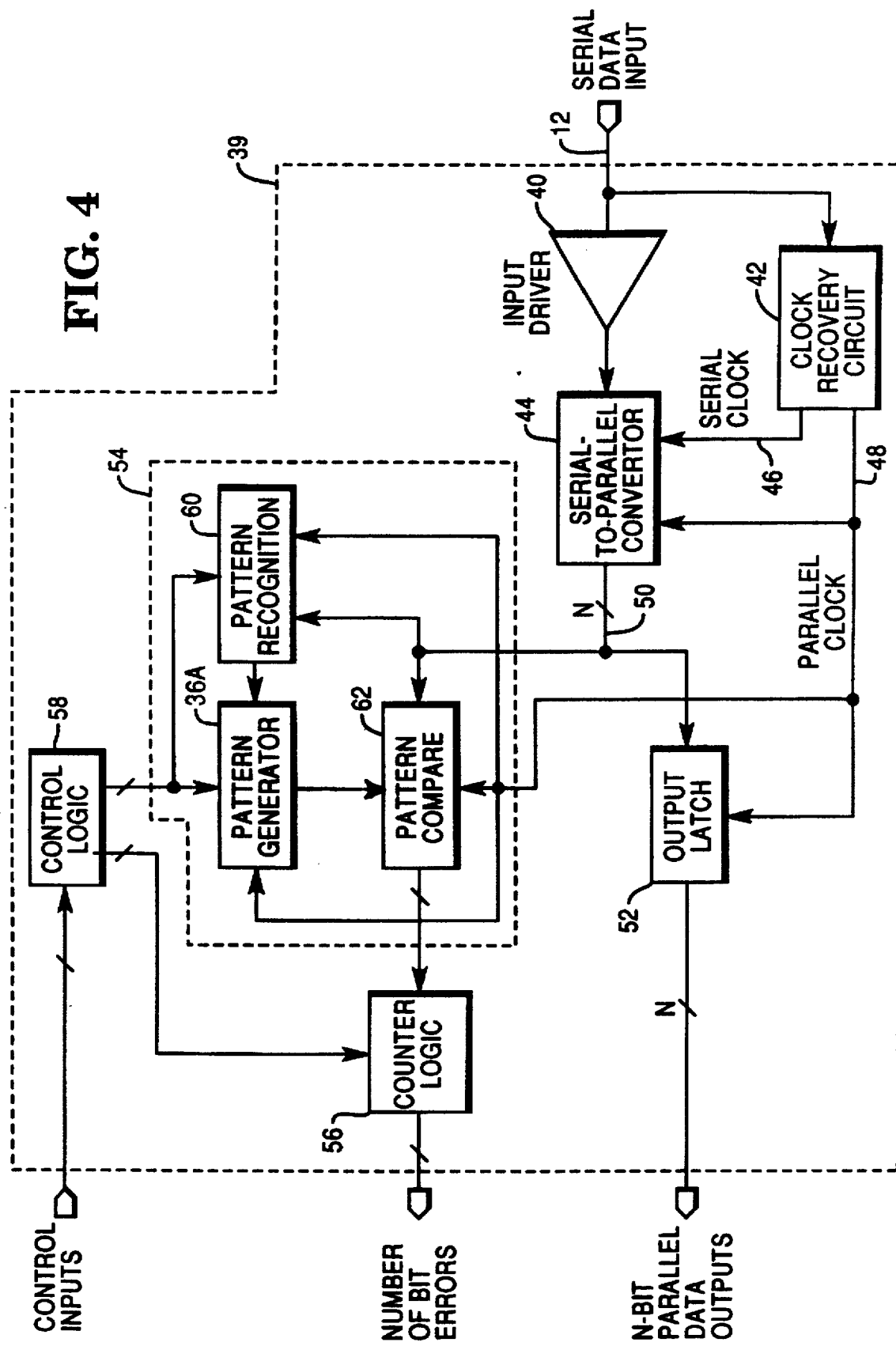
FIG. 4 is a simplified block diagram of a receiver connected to a digital communication link and incorporating an integral bit error rate test system for use with the transmitter of FIG. 3.

Turning now to FIGS. 3 and 4 in general and to FIG. 3 in particular, there is shown one form of implementation of the present invention in which a capability for bit error rate testing is integrally incorporated into a data communication apparatus, such as the transmitter Tx shown in FIG. 1. During normal data transmission, Host 1 provides data in byte increments (N-bit parallel data) via bus 22 to an input latch 24 in transmitter 25, i.e., a modified arrangement of transmitter Tx. For simplicity, the parallel data lines or buses are shown as single lines with a diagonal cross-line. A clock generator 26 provides clock signals to latch 24 for periodically transferring a parallel data byte from latch 24 through a multiplexor (MUX) 28 to a parallel-to-serial converter 30. The converter 30 converts the parallel data byte to serial format and outputs a serial data bit stream to an output driver 32 for transmission via link 12. The latch 24, clock generator 26, converter 30 and driver 32 may be implemented as a custom integrated circuit or assembled from commercially available integrated circuit chips. Circuit boards suitable for installation in conventional PC's and including both the unmodified transmitter Tx and unmodified receiver Rx are commercially available from various manufacturers.

The present invention further includes a control logic circuit 34, a bit test pattern generator 36 and the multiplexor (MUX) 28. Control logic circuit 34 provides a signal to generator 36 which initiates operation of the generator causing it to produce a determinable bit test pattern. The bit test pattern may be fixed or pseudo-random, e.g., the pattern may be stored in a read only memory (ROM) or register, may be generated by a sequence of flip-flops or may be created by a software program running in a microprocessor, all of which are well known in the art. The bit test pattern from generator 36 is coupled to MUX 28. Another signal from control logic circuit 34 applied to MUX 28 enables the MUX to selectively couple the bit test pattern to parallel-to-serial converter 30. More particularly, the data from the host computer is coupled, via latch 24, to a first set of input terminals of MUX 28 while data from bit test pattern generator 36 is coupled to a second set of input terminals of MUX 28. The control signal from logic circuit 34 is coupled to a control terminal of MUX 28. When the control signal switches between polarities, the MUX 28 selectively couples either the first or second set of input terminals in circuit with its output terminals. The MUX 28 is a conventional multiplexor of a type well known in the art.

The control logic circuit 34 may be implemented as a customized integrated circuit or may be part of a microprocessor circuit which could include test pattern generator 36. Logic circuit 34 receives a command via line 38 to initiate or to cease a test sequence. Upon initiation of the test sequence, circuit 34 commands bit test pattern generator 36 to generate a preselected or pseudo-random bit pattern and at the same time provides a signal to MUX 28 to decouple from input latch 24 and to couple the pattern from generator 36 to converter 30. The bit test pattern is then transmitted by driver 32 onto link 12. Note that in order to conserve power, the generator 36 is disabled except during testing.

Turning to FIG. 4, at the receiver end 39 of link 12, the bit test pattern is first processed by an input buffer 40, clock recovery circuit 42 and serial-to-parallel converter 44. The clock recovery circuit 42 extracts a clock signal from the received data in a conventional manner and applies the clock signals to the converter 44. The serial clock signals on line 46 are a multiple of the parallel clock signals on line 48, the multiple being a function of the data byte size, i.e., whether each byte is 8, 16 or 32 bits. The parallel data (actual data or data forming the test pattern) from converter 44 is coupled via bus 50 to both an output latch 52 and a test pattern checker 54. The latch 52 is also clocked by the parallel clock signals, line 48, and supplies data signals to the receiving host, e.g., Host 2. The data signals are clocked through latch 52 irrespective of whether the system is in a test mode or normal data receive mode although, during the test mode, the received data is ignored by the Host 2.

In the test pattern checker 54, the received test signals are compared to a pattern of test bits identical to the transmitted bits. Each time a bit error is detected, the test pattern checker outputs an error detect signal to a counter logic 56. At the end of the test, the output or count registered by counter logic 56 is read out to provide an indication of bit error rate. The counter logic 56 may be implemented so as to count the total number of bits received during a test and to divide the number of detected errors by the total count to generate an actual error rate. A control logic circuit 58, substantially corresponding to logic circuit 34, provides control signals on command to both counter logic 56 and pattern checker 54. The control signals serve both to reset counter logic 56 and to effect a read out of the accumulated count. The control signals also enable and disable operation of pattern checker 54.

The pattern checker 54 incorporates the same type bit pattern generator 36A as is used in the transmitter to enable generation of identical bit patterns at the receiver as was generated at the transmitter. For example, generator 36A and generator 36 may comprise ROM devices storing preselected bit patterns. At the checker 54, the received bit pattern is identified either by a header or as a preselected fixed pattern in a pattern recognition logic circuit 60 which then enables pattern generator 36A to produce an identical pattern to that which was transmitted. The received pattern is then compared bit-by-bit in a pattern compare logic 62 with the checker generated pattern from generator 36A. The comparison may be performed using conventional techniques such as an AND logic gate or an exclusive OR logic gate or an array of such gates for implementing the comparison on a multi-bit or byte basis. In the latter case, the counter logic 56 may be coupled to the comparison circuit of checker 54 so as to count byte errors rather than bit errors.

It will be recognized that the above described method and apparatus can be implemented at either an integrated circuit or chip level or at a circuit board level. At the chip level, the system may use customized circuitry while at the board level, implementation may be had with commercially available integrated circuit components. Of course, some combination of custom chip and commercial component may be created with the same result. The system may also be software implemented using a microprocessor in the transmit and receive systems.

While the implementation of FIGS. 3–4 has focused on separate components for a transmitter and receiver, it will be appreciated from FIG. 1 that each unit, such as a PC, includes a transmitter and a receiver. In such instance, the control logic circuits 34 and 58 may be the same circuit adapted for concurrently enabling both the transmit and receive bit test pattern components. Further, the test pattern generator 36 may produce the bit test pattern for the receiver under special conditions, e.g., if the bit test pattern is fixed or if the transmit and receive circuits of one system are linked by a closed loop into a self-test arrangement. It is contemplated that the system of FIGS. 3–4 could be in one host and the link 12 could be merely a closed link between the transmitter and receiver so as to enable testing of the system as a stand-alone unit.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A data communications apparatus, comprising:
   a source of digital signals to be transmitted over a closed communication link;
   a support structure;
   a transmitter disposed on the support structure and the transmitter coupled between the source and the closed communication link for transmitting the digital signals onto the closed communication link;
   an internal bit error rate test system for providing a determinable pattern of digital test signals into an input of the transmitter in place of the digital signals from the source;
   receiver means coupled to the closed communication link for receiving a received pattern of digital test signals, with the receiver means being disposed on the support structure that also has the transmitter disposed thereon;
   said closed communication link including means for conducting the determinable pattern of digital test signals to the receiver means, said means for conducting being made of a solid material in defining a predetermined path for the determinable pattern of digital test signals, wherein, when no error occurs between the transmitter and the receiver means, the received pattern corresponds to the determinable pattern and said means for conducting conducts the determinable pattern from the transmitter to the receiver means during the entire transmission thereof; and
   means coupled in circuit with the receiver means for comparing the received pattern of the digital test signals to the determinable pattern of digital test signals for measuring the bit error rate, wherein the determinable pattern of digital test signals provided to said input of the transmitter and the determinable pattern of digital test signals provided to said means for comparing by the receiver means is provided by the same generating means, the determinable pattern to said means for comparing being generated after said receiver means receives said received pattern.

2. The apparatus of claim 1 wherein said generating means comprises a pseudo random bit pattern generator.

3. The apparatus of claim 1 wherein said generating means comprises means for generating a fixed bit test pattern.

4. The apparatus of claim 1 wherein said internal bit error rate test system comprises a multiplexor having a first input coupled to said digital signal source and a second input coupled to said generating means, an output of said multiplexor being coupled to said transmitter.

5. The apparatus of claim 1 wherein said receiver means comprises a bit pattern check circuit for comparing each bit of the received pattern to the determinable pattern and for generating a bit error signal for each detected bit error between the received pattern and the determinable pattern, and counter means for counting said bit error signals for providing an indication of said bit error rate.

6. The apparatus of claim 1 wherein said receiver means includes a serial-to-parallel converter for converting the received pattern of digital test signals to data bytes, said comparing means being operative to compare each data byte to the determinable pattern for establishing said byte error rate.

7. The apparatus of claim 1 wherein the determinable pattern of digital test signals is organized in pre-selected data bytes, said comparing means operating on each byte for providing an indication of byte error rate.

8. The apparatus of claim 1 wherein said internal bit error rate test system comprises a bit test pattern generator for generating a data byte of N-bits, control logic means responsive to a test command signal for enabling said bit test pattern generator and a multiplexor connected in circuit between said bit test pattern generator and said communication link, said control logic means concurrently enabling said bit test pattern generator and said multiplexor for coupling said data byte to said link.

9. The apparatus of claim 8 and including a parallel-to-serial data converter coupled between said multiplexor and said link.

10. The apparatus of claim 1 wherein said receiver means comprises a byte test pattern checker including means for receiving the received pattern of digital test signals, means for comparing a sequence of data signals related to the received pattern to the determinable pattern of digital test signals and for counting each occurrence of an error therebetween.

11. The apparatus of claim 1 further including control means in communication with said generating means, wherein said same control means enables both the determinable pattern input to the transmitter and the determinable pattern provided to said means for comparing.

12. The apparatus of claim 11 wherein said control means outputs at least one control signal for concurrently enabling the outputting of the determinable pattern to the transmitter and the determinable pattern to said means for comparing.

13. A data communications apparatus, comprising:

a source of digital signals to be transmitted over a closed communication link;

a support structure;

a transmitter disposed on the support structure and the transmitter coupled between the source and the closed communication link for transmitting the digital signals onto the closed communication link;

an internal bit error rate test system for providing a determinable pattern of digital test signals into an input of the transmitter in place of the digital signals from the source;

receiver means coupled to the closed communication link for receiving a received pattern of digital test signals, with the receiver means being disposed on the support structure that also has the transmitter disposed thereon;

said closed communication link including means for conducting the determinable pattern of digital test signals to the receiver means, said means for conducting being made of a solid material and defining a predetermined path for the determinable pattern of digital test signals wherein, when no error occurs between the transmitter and the receiver means, the received pattern corresponds to the determinable pattern and said means for conducting conducts the received pattern from the transmitter to the receiver means during the entire transmission thereof;

means coupled in circuit with the receiver means for comparing the received pattern of the digital test signals to the determinable pattern of digital test signals for measuring the bit error rate wherein the determinable pattern of digital test signals provided to said input of the transmitter and the determinable pattern of digital test signals provided to said means for comparing by the receiver means is provided by the same generating means, the determinable pattern to said means for comparing being generated after said receiver means receives said received pattern; and a control logic circuit in communication with said means for comparing, wherein said control logic circuit enables both the received pattern received by the the receiver means and the determinable pattern received by said means for comparing to be provided, said control logic circuit being disposed on the same support structure that also has the transmitter and receiver means disposed thereon and wherein said control logic circuit also controls whether test data or normal data is to be transmitted by the transmitter, said control logic circuit controls recognition of the received pattern and said control logic circuit controls counter logic for measuring error rate related to said received pattern.

* * * * *